(12) United States Patent
Tucker

(10) Patent No.: US 7,944,326 B2
(45) Date of Patent: May 17, 2011

(54) EMC FILTER

(75) Inventor: Andrew Cecil Tucker, Solothurn (CH)

(73) Assignee: Schaffner EMV AG, Luterbach (CH)

( * ) Notice: Subject to any disclaimer, the term of this patent is extended or adjusted under 35 U.S.C. 154(b) by 0 days.

(21) Appl. No.: 12/749,835

(22) Filed: Mar. 30, 2010

(65) Prior Publication Data

US 2010/0182100 A1    Jul. 22, 2010

Related U.S. Application Data

(63) Continuation of application No. PCT/EP2007/060763, filed on Oct. 10, 2007.

(51) Int. Cl.
*H03H 7/00* (2006.01)
*H02M 1/12* (2006.01)

(52) U.S. Cl. ............ 333/181; 363/39; 327/552

(58) Field of Classification Search ........ 333/181, 333/167, 175, 177; 363/39, 45; 327/552
See application file for complete search history.

(56) References Cited

U.S. PATENT DOCUMENTS

| | | | |
|---|---|---|---|
| 5,999,423 A * | 12/1999 | Steinke et al. | 363/40 |
| 6,075,425 A * | 6/2000 | Gopfrich et al. | 333/181 |
| 6,122,183 A * | 9/2000 | He et al. | 363/44 |
| 6,775,157 B2 * | 8/2004 | Honda | 363/39 |
| 6,898,092 B2 * | 5/2005 | Briere et al. | 363/39 |
| 7,629,836 B2 * | 12/2009 | Kull et al. | 327/552 |
| 7,659,797 B2 * | 2/2010 | Tucker | 333/181 |

FOREIGN PATENT DOCUMENTS

| | | |
|---|---|---|
| EP | 0995266 A1 | 4/2000 |
| EP | 1069673 A1 | 1/2001 |
| EP | 1619768 A1 | 1/2006 |
| WO | 9405067 A1 | 3/1994 |
| WO | 2006008322 A2 | 1/2006 |

* cited by examiner

*Primary Examiner* — Robert Pascal
*Assistant Examiner* — Kimberly E Glenn
(74) *Attorney, Agent, or Firm* — Blank Rome LLP

(57) ABSTRACT

An EMC active filter capable to maintain a low earth leakage current at all times, thus being compatible with RCD devices. The filter of the invention has an especially simple inductor's structure, where typically the power conductors pass straight through the filter, without windings, and most of the components can be implemented in a modular shunt circuit. Preferably the filter is realized by connecting the shunt module by an IDC device to the phase conductors, or directly to the line and load terminal, thus avoiding cutting and splicing high-current cables. The particular protection circuit of the filter prevents in-rush current at power on, and limits earth leakage current even in case of a fault in the line.

14 Claims, 5 Drawing Sheets

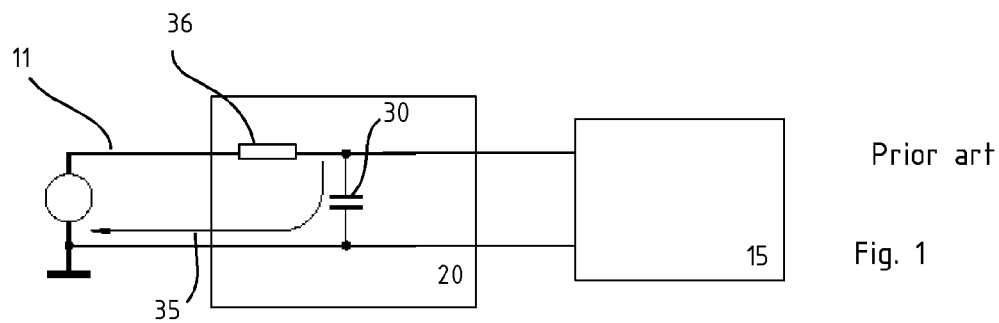
Prior art
Fig. 1
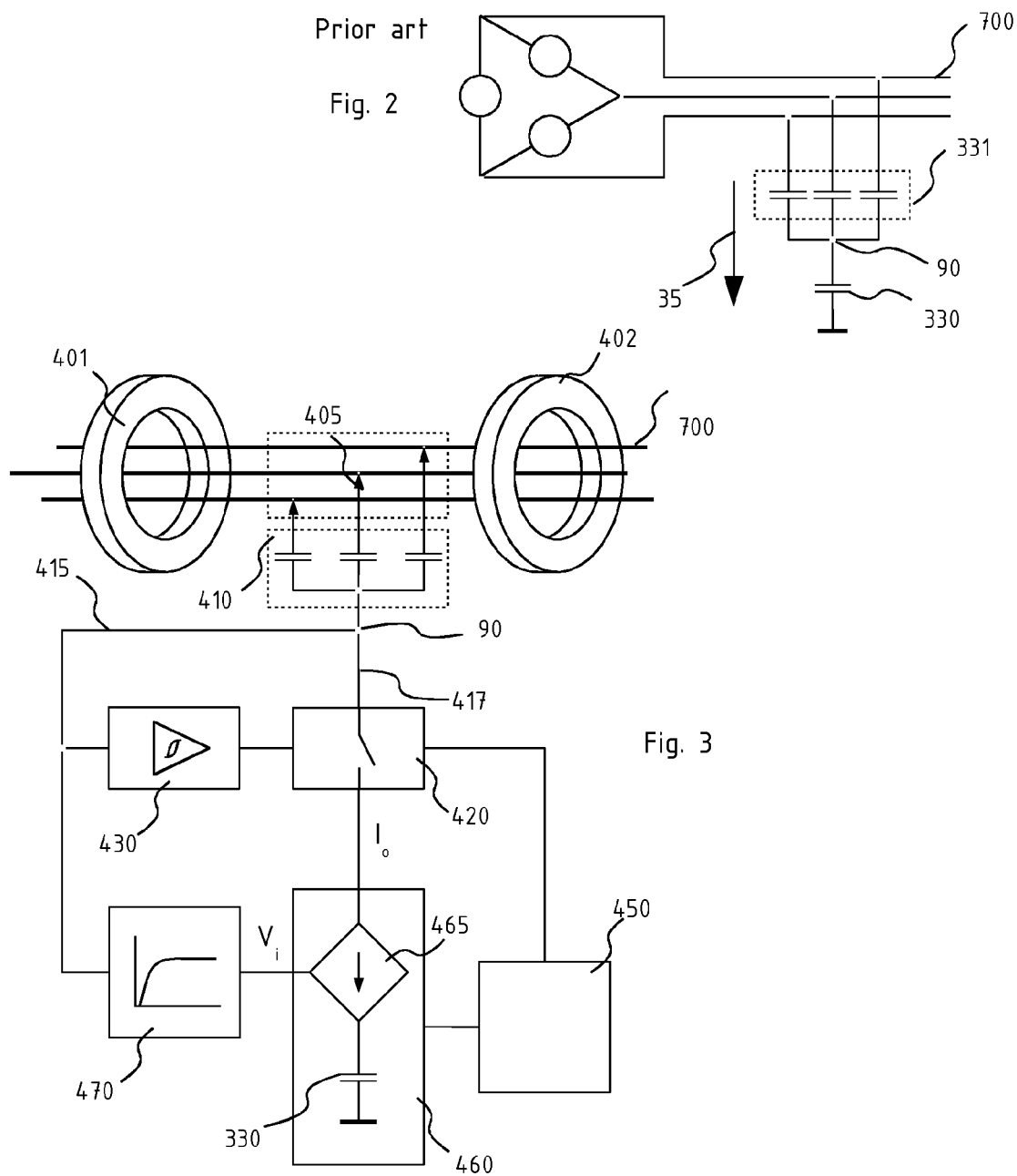
Prior art
Fig. 2
Fig. 3

US 7,944,326 B2

EMC FILTER

BACKGROUND INFORMATION

This application is a continuation of PCT application No. PCT/EP2007/060763 (WO2009/046762 filed Oct. 10, 2007 the content of which is hereby incorporated in its entirety by reference.

FIELD OF THE INVENTION

This patent application relates to electrical filters for filtering an unwanted noise component from an electrical or electronic circuit or line and more particularly, but not exclusively, to electromagnetic compatibility filters for mains lines or distribution lines at mains frequency.

DESCRIPTION OF RELATED ART

Electromagnetic compatibility (EMC) is an increasingly critical factor in the electric and electronic industry nowadays. A large number of electric circuits and appliances exist, which are liable to generate unwanted electrical noise, or to suffer from noise generated by other circuits or appliances.

The conducted noises and disturbances are generally dealt with by inserting a low-pass LC filter on the mains supply line of the noise-generating devices or of the noise-sensitive devices. Such filters attenuate the unwanted frequency components to a harmless level. Many filter topologies, including the classic "L", "T" and "pi" filter topologies, can be employed.

European Patent application EP1069673 shows an example of a three-phase noise suppression filter comprising passive elements.

Passive EMC filters have been proven effective in a number of applications. A shortcoming of this technique, however, is that in order to attain the required attenuation level, high-value capacitors and inductances are needed for this application. The size and cost of the resulting filter are mainly determined by these large components, in particular when high attenuation of common mode noise is needed. Moreover, the leakage current is directly proportional to the capacity of the filter capacitors.

It is also known to employ active elements in noise suppression filters, for example as in European patent EP0995266. The use of active elements allows the use of smaller inductances and capacitors, thereby providing more compact filters. The existing conventional active filters however, have a reputation of being less reliable than their traditional passive homologues, and there are concerns that they might fail due to overvoltage or over-temperature breakdown, or exhibit instability and oscillations. Power line EMC filters include in most cases capacitors to earth, so called Y capacitance, together with an appropriate inductance, in order to achieve common mode attenuation. An unavoidable unwanted consequence of this is that a current flows to earth through the Y capacitor—the so called Earth leakage Current (ELC). In FIG. 1, which shows, in single-line diagram form, an example of a known EMC filter, the Y capacitance is indicated by reference number 30, 36 is the corresponding inductance, and 35 is the path of earth leakage current. As a rule, the higher the capacity of the Y capacitor and the voltage rise across it, the more intense is the ELC.

At high level, this ELC is considered dangerous to personnel. Apart from the personal danger, excessive ELC can interfere with the reliable operation of an electrical system. In particular installations that include Residual Current Detection (RCD) will be interrupted due to tripping of the RCD device. Hence it is considered good design to minimize earth leakage current when designing EMC filters.

For power systems with star grounded supply (i.e. a TN system in Europe) earth leakage can be a problem, although because the system is balanced around earth potential, the ELC is usually moderate, in normal conditions. High ELC values may however arise in high-power filters or where strong common-mode attenuation is needed.

A similar problem exists with IT power systems, as employed, among others, in ships and factories. Here the mains power is only loosely referenced to earth via high impedance. This is done so that in the event of one phase short circuiting to earth, the installation will continue to operate with relative safety. However in this shorted mode the power system is in effect "corner earthed" and the star point 90, of FIG. 2 will see and fast transient voltages. If large capacitors are used then a high ELC will exist that may exceed the power limit of the Y capacitor and result in a catastrophic failure, which in turn may force a power outage. This chain of failures may compromise the reliability of IT power system.

There is therefore an increasing demand for noise suppression filters with low ELC. Traditionally to limit ELC, such filters have been constructed with reduced capacitance in the earth path. However in order to maintain a suitable attenuation, the filter inductance must accordingly be increased to compensate for the reduced capacitance, which can make the filter larger and more expensive. Even increasing the inductance value is not a complete solution however and filters with small Y capacitance are often less effective, for EMC noise reduction, than filters with a higher Y capacitance. In addition, this increased inductance can lead to increased power loss, temperature rise and end-to-end voltage drop, all adverse conditions.

BRIEF SUMMARY OF THE INVENTION

There is therefore a need for a EMC suppression filter that combines a high attenuation at all frequencies, low ELC, and compact size.

Additionally there is a need for an EMC filter that can be easily adapted to a variety of applications, and that is safe both in normal and faulty conditions. According to the invention, these aims are achieved by means of the object of the appended claims.

BRIEF DESCRIPTION OF THE DRAWINGS

The invention will be better understood with the aid of the description of an embodiment given by way of example and illustrated by the figures, in which:

FIG. 1 is a single-line diagram. It shows, in a simplified schematic way, an EMC filter of known type and the path of the leakage current.

FIG. 2 shows, in a simplified schematic way, a three-phase EMC filter of known type and the path of the leakage current.

FIG. 3 illustrated in a block schematic way, an active EMC filter according to one aspect of the present invention.

DETAILED DESCRIPTION OF POSSIBLE EMBODIMENTS OF THE INVENTION

Figure 4:
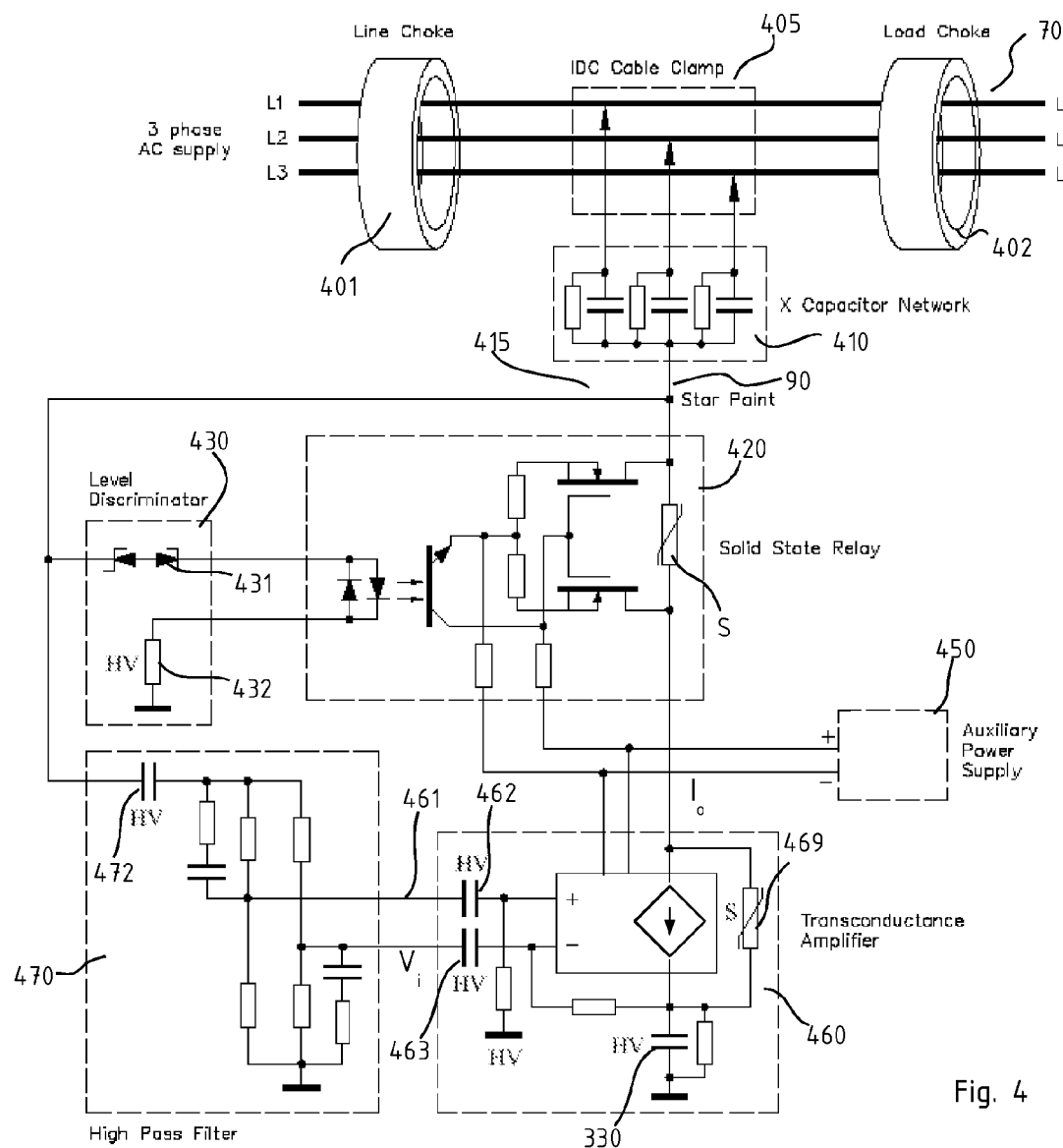
FIG. 4 illustrates, with more detail, an example of EMC filter according to one aspect of the invention.

The problem and the causes of earth leakage in EMC filter is illustrated in FIG. 1. A power line 11, which can be single or multi-phase, is connected to a device 15 by means of a filter 20, in order to suppress possible interference generated by device 15 and transmitted along the line 11. The filter, in this simple realization includes the series inductances 36 and a "Y" capacitor 30 connected between phase conductors and the earth conductor. Any potential seen across the "Y" capacitor 30 will contribute largely to the earth leakage current 35.

The same situation, but in the case of a three-phase power line, is represented in FIG. 2. In this case know filters employ a bank of "X" capacitors 331 connected across phase conductors 700, which contribute to the reduction of differential mode noise. Common-mode noise, on the other hand, is suppressed by the capacitor 330 connected between the star point 90 and the ground. If, as in the represented corner-grounded example, the phase potential are not balanced with respect to the ground potential, the "Y" capacitor 330 sees a large potential and lets flow a substantial earth leakage current 35.

FIG. 3 is a simplified block diagram of a low-pass EMI suppression filter for AC power lines. It comprises the two inductances 401 and 402, respectively to the line side and to the load side separated by a central shunt path to earth, thus forming a "T" filter. According to an unrepresented variant, the filter has a "L" scheme, including only one inductor, either at the line side or at the load side. The tap unit 405 provides a galvanic connection to the power cables with the purpose of shunting to earth the RF noise current. The invention comprises different devices for realizing this galvanic connection. Preferably, however, this is obtained by an insulation displacement connector (IDC). The IDC technique saves manufacturing time and avoids cutting and splicing the high-current phase conductors 700. It does not require additional insulation, which would be needed if the phase conductors were exposed, and provides a mechanical support for the power cables, which can be quite large in high-power application.

The X capacitor network 410 is typically constructed from 3 capacitors connected in star. This is required in the important case of a three-phase power system, but could be omitted in a single-phase low-voltage system, for example. A high-value bleed resistor (not shown in this figure, but visible in FIG. 4) is often connected in parallel with each capacitor. The X capacitors provide symmetrical mode attenuation; they also provide a low impedance path between each phase and the capacitor star point 90 for asymmetrical RF noise.

The level discriminator block 430 monitors star point voltage relative to the earth potential. When the star point voltage exceeds a set level the discriminator 430 passes an inhibit signal to the switch device 420. The level discriminator 430 can optionally include some signal integration (not shown), to suppress the inhibit signal in the event of fast transient. The integration time constant can be set in relation to the transients expected during in normal operating conditions. Optionally, the output of the discriminator 430 can be made available outside the filter unit, to signal the occurrence of a fault. The filter could then comprise an electrical error output, or an optical error output (i.e. a fault LED).

A switch unit 420 is interposed between the star point 90 and the amplifier block 460. Preferably the switch unit is based on a solid-state relay device (SSR), but could also include an electromechanical relay, or any suitable switching device. The purpose of switch unit 420 is to isolate the capacitor star point 90 from earth in the case of a line insulation fault, or an excess unbalance, or any condition that causes the voltage at star point 90 to rise above normal values. The switch unit accepts also a control from the auxiliary power supply unit 450.

Inhibit also causes the switch unit to open in the event of a line fault, detected by the rise in potential of the star point 90 with respect to earth. The switch unit 420 provides an extra degree of security and ensures that the ELC remains within safe limits in all conditions, and that the filter is fault-tolerant. In the case of an insulation fault of one phase in an IT system, for example, the filter will effectively cut itself out, and the system can continue operating, but with a higher noise level, until the fault can be repaired.

The auxiliary power supply 450 is a small isolated power source, It can be placed remotely and be external to the filter, or integrated into it. It should be powered from the same power line that runs through the filter and, typically it will be placed on the load side of the filter. The power requirement of the system is directly proportional to the output voltage of the supply unit; hence there is a bonus in choosing a moderate voltage level. Typically 48 V DC and 10 W continuous output power are sufficient. At switch-on there is no voltage from the power supply unit 450, and the relay is in its normal open position. This avoids inrush current passing through the amplifier block 460 to earth.

The amplifier block 460 receives its supply from the power supply unit 450 and includes a controlled source 465 arranged to sink a current $I_o$ as a function of the voltage input $V_i$, provided by the filter 470. Preferably the controlled source approximates a controlled current source, as it is shown in the drawings, but this is not an essential or limiting feature of the invention. The filter 470 is a high-pass filter dimensioned to reject, or at least attenuate, power frequencies, and to let pass radio frequencies to the amplifier 460. The filter corner frequency is set, for example, at 150 kHz.

The amplifier 460 is arranged, for example, to sink a current $I_o$ proportional to a voltage input $V_i$. In this case the transfer function $$G(f) = \frac{I_O(f)}{V_I(f)} \tag{1}$$

has the dimension of an inverse impedance, and the amplifier 460 is termed a transconductance amplifier. Note however that this is not an essential feature, and that the filter of the invention could be modified to use a current-controlled current source, or any suitable controlled current source, according to the circumstances. Also the input $V_i$ can be differential or single-ended, according to the case.

It can be appreciated that the current $I_o$ has the effect to reduce the voltage at the star node 90, which, in turn reduces the drive of the amplifier 460 via the sense wire 415 and the high-pass filter 470. The filter has a negative feedback which tends to stabilize the input potential, in this case the potential of star point 90, at a constant value, at least in the noise frequency band. In this way the impedance at star point 90 at RF frequency is very low and an effective shunting of noise is realized. Importantly, the input $V_i$ is directly measured by the sense wire 415, which carries no significant current and, therefore, introduces a negligible voltage error. Any voltage drop in the switch unit 420 and in the connection cables is compensated by the forward gain in the amplifier 460. The filter of the invention can tolerate and is not influenced by the residual impedance in the "on" state of the switch 420, and by the length of the cable 417. The forward gain of the amplifier also compensates for the voltage drop across earth capacitor 330.

The amplifier unit 460 comprises a high-voltage rated capacitor 330, for example a X2-rated capacitor, to ensure the insulation for ground under any circumstance, for example during high-potential or surge tests. Equivalent insulation is provided, where appropriate, also in the discriminator 430 and filter 470, but the corresponding capacitors are not drawn to avoid cluttering the figure. It is important to note that the value of the capacitor 330 must be chosen in function of the supply voltage from power supply 450, a smaller capacitor requiring a larger swing to pass the desired current. Due to the relatively small value of the capacitor 330 and to the strong attenuation of power frequencies by high-pass filter 470, the ELC in the filter of the invention is sensibly smaller than in conventional filters of similar performances.

FIG. 4 illustrates another example of a low-pass EMI noise suppression filter according to another embodiment of the invention. The same reference number in this and other figures of the present application indicates identical or equivalent features.

This embodiment of the invention is a "T" type filter including two symmetrical chokes, the line choke 401 on the line side and the load choke 402 on the load side, separated by a central shunt path to earth, that is preferably obtained by an insulation displacement connector (IDC) 405.

The line and load chokes 401, 402 impose longitudinal asymmetrical impedance in the line. Typically a high permeability magnetic core material will be used. Preferably very few turns will be applied to the core. Typically the power cables will pass just once through the core. Thus the chokes resemble beads which are strung onto the power cables. These chokes are therefore easy to manufacture, in particular for high current applications. They are low in cost, compact, have low temperature rise, low power loss and low line to load voltage drop. In addition the power cables can remain insulated so creeping and clearance distances within the choke are not an issue. Because chokes are small, no resin (potting compound) is required to secure the chokes which further reduces cost and weight. Without resin the filter can be more easily recycled which is has become an environmental issue. The chokes 401, 402, however, could be replaced by inductive elements of a different kind, for example wound inductors, without departing from the scope of the invention.

Level discriminator 430 is realized by two back-to-back Zener diodes 431, and is suitably insulated to earth by an HV-rated resistor 432. It directly drives the input of the solid-state relay in the switch unit 420, which is optically isolated. Component 421 is a transient voltage suppression device, for example a MOV varistor, a TranZorb® (Trademark of Vishay), or any other component suitable for limiting the voltage drop across the solid state relay, for example during surge tests. A similar device 469 is used in the amplifier unit 460, for the same purpose.

The high-pass filter 470 in this realization is a two-stage bridge-type filter with differential output 461. This has the advantage is reducing excessive phase shift which might lead to resonance. Other realizations are however possible and comprised in the scope of the invention. The high-pass filter 470 is referenced to earth potential and it is insulated from nearby stages by means of the high-voltage rated capacitors 472, 462, and 463. It is important to note that the high-voltage and surge insulation in the filter of the invention relies entirely on passive insulation means. The filter of the invention has a positive insulation of the power conductors 700 from earth, that can not be compromised by a malfunction of the active components.

Figure 5:
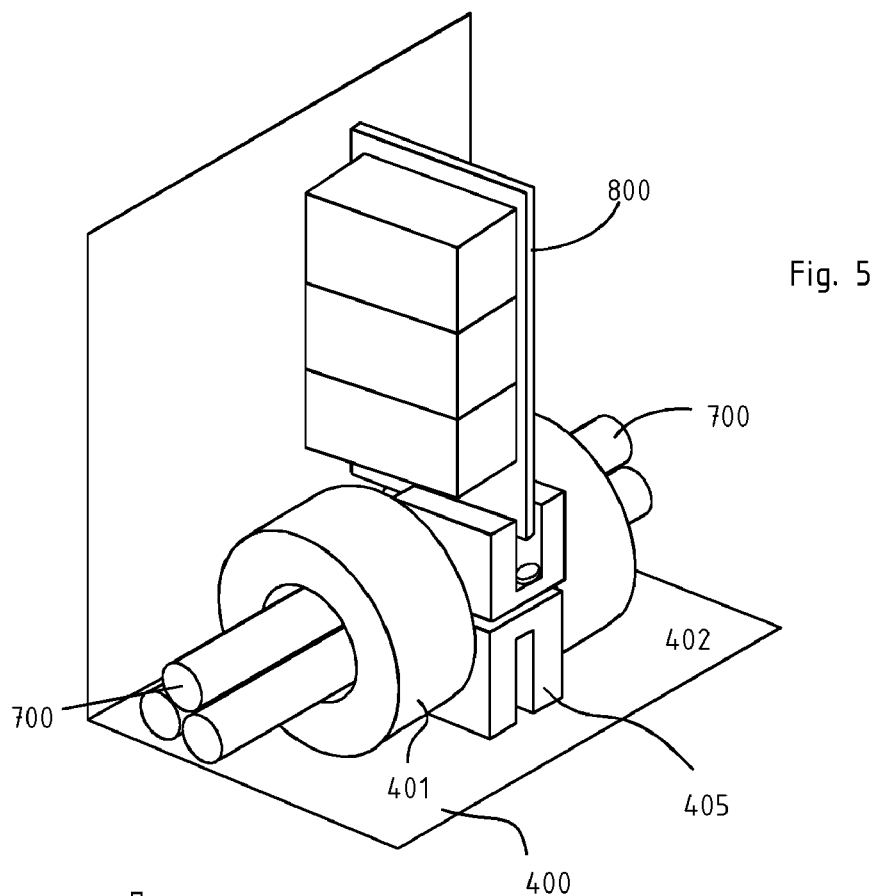
FIGS. 5 and 6 show schematically a possible assembly of a filter according to the invention.
Figure 6:
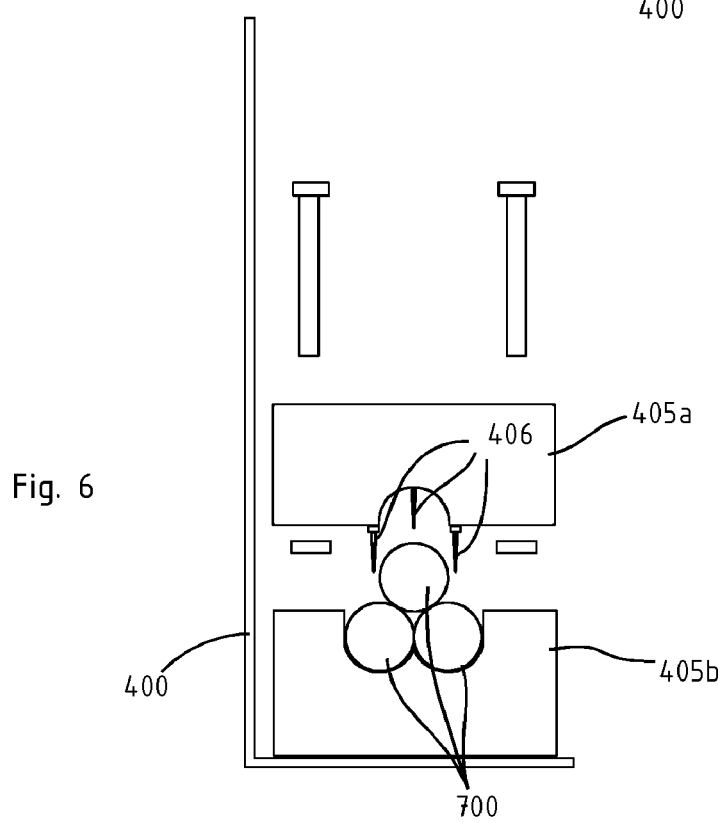

FIGS. 5 and 6 illustrate the assembly of the filter and the IDC connector. The IDC cable clamp 405 comprises two halves 405a and 405b which are tightened on the power cables 700. The upper clamp 405b carries three insulation displacement devices 406, for example needles or blades, to pierce the power cable insulation and provide a galvanic connection with each of the three power phases. In addition the cable clamp 405 is preferably fastened to the housing 400 of the filter and provides mechanical support for the power cables, which can be quite large in high current applications. This saves manufacturing time as there is no need to remove insulation from cables or to cut and re-join cables in order to make galvanic connections. It also avoids exposing bare copper thus avoiding the need for additional insulation. According to non-illustrated variants of the invention, the filter could comprise separate clamps for each of the power phases. The cable clamp 405 preferably serves as support for the remaining components of the noise filter, for example on a PCB-mounted module 800, as it is shown on FIG. 5.

According to another aspect of the invention, the active module 800 can be combined, according to the needs with a minimal number of external components to compose an EMC filter. In this way, the EMF filter of the invention can be conveniently integrated in a host equipment. Preferably the module 800 comprises the switch unit 420, the transconductance amplifier 460, the high-pass filter 470 and the discriminator 430; the auxiliary power supply 450 and the X network 410 can be included in the module 800, or provided separately according to the needs. In this way the EMF filter of the invention can be conveniently integrated in a variety of host devices.

Reverting to FIG. 3, the X capacitor network 410 is typically constructed from three capacitors of the appropriate insulation class, for example capacitor rated X1, X2, Y1, or Y2 according to EN 132400. A high value bleed resistor is connected in parallel with each capacitor. These capacitors provide symmetrical mode attenuation. They also provide a low impedance path between each phase and the capacitor star point 90 for asymmetrical radio frequency noise.

The solid state relay 420 isolates the capacitor star point from earth at switch-on and in the event of a fault. Two control inputs are provided to the solid state relay 420, one from the auxiliary power supply 450 and the inhibit signal from the level discriminator 430. At switch-on there is no output voltage from the auxiliary power supply so the relay is open circuit. This avoids inrush current passing through the transconductance amplifier 460 to earth. Inhibit input causes the relay to open circuit in the event of a line fault. This avoids current passing from the capacitor star point 90 to earth via the Transconductance Amplifier 460. The solid state relay 420 has on-state residual impedance which might impede RF current.

The high-pass filter 470 conditions the capacitor star point voltage Vs. It rejects power frequencies and passes radio frequencies to the transconductance amplifier's input 461, The transfer function of the transconductance amplifier 460 is indicated as B(f) and has, for example, a break point at 150 kHz.

The transconductance amplifier 460 provides a current output $I_o$ controlled by a differential voltage input $V_i$, It is characterized by a frequency-dependent transfer function G(f). So output current is $$I_o(f)=G(f) \cdot V_i(f) \tag{2}$$

Typically G(f) can be modified with lag-lead circuits to avoid excessive phase shift which may lead to oscillations and instabilities, as it is known in the art. Over-current and over-voltage protection are provided to protect the transconductance amplifier 470 during high-potential testing and from line transients. DC biasing is provided via an internal feedback resistor. The transconductance amplifier 460 could be replaced by a voltage amplifier, or any other active shunt device, as it is known in the art.

Impedance from Star Point to Earth

From the above equations, the frequency dependent impedance between the star point and earth is $Z_s(f)=V_s/I_O=1/B(f) \cdot G(f)$. Note that the SSR on-state residual impedance is not relevant to $Z_s$.

High Attenuation Mid-Band

The shunt path provides low RF impedance from capacitor star point 415 to earth at mid-band (at and above HPF break point). Typically $Z_s$ will be less than one ohm mid-band which results in high asymmetrical mode attenuation. The $Z_s$ vector will have a real component because B(f) and G(f) have real components. At the HPF break point $Z_s$ can be almost purely resistive. Passive LC filters display under-damped ringing at their characteristic frequencies. This invention behaves more like an LR filter and thus avoids excessive ringing.

Low Normal-Mode Earth Leakage Current

At power frequencies the high-pass filter 470 attenuates strongly the voltage of the star point $V_s$ so $V_i$ will approach zero. Therefore the transconductance amplifier 460 produces virtually zero current at power frequencies and earth leakage current is minimized. At power frequencies $Z_s$ approaches an open circuit.

Low Switch-On Earth Leakage Current

At switch-on the solid state relay 420 is open circuit because the auxiliary power supply 450 is off. Thus the star point voltage $V_s$ can swing to the peak line voltage and no earth current will flow to earth via the transconductance amplifier 460. Thus in-rush earth leakage current will be minimized. By contrast, high in-rush earth leakage current is common for passive LC filters.

Low Fault-Mode Earth Leakage Current

Under normal conditions star point voltage $V_s$ will vary at power frequencies (mainly fundamental and low-order harmonics). This is due to any imbalance in the phase voltages and due to imbalance in phase loading. Voltages of up to 20 V rms are typical. Under these conditions the solid state relay 420 remains closed. Under fault conditions the star point voltage relative earth will increase significantly. In a TN supply the capacitor star point will increase to $0.5^*V_p$ for a single fault and $V_p$ for double fault, where $V_p$ is the phase to neutral rms voltage. In an IT supply the star point voltage will be $V_p$ for a single fault. Under all these conditions the level discriminator 430 provides an inhibit signal and opens the solid state relay 420. This will occur within a set time depending on the time delay of the circuit and the time constant of any integration components added. Thus the high steady-state earth leakage current experienced by passive LC filters during a fault is avoided. In IT systems it is not usual to use passive LC filters because of the risk of damage to the filter and undesired tripping of the system in the event of a fault. The filter of this embodiment of the invention can be incorporated on an IT system without risk to either filter or system.

High Voltage Isolation Strategy

With reference to FIG. 4, the voltage-withstand between phases and phase to earth is equivalent to a conventional passive LC filter. The isolating components are capacitors and resistors compliant with the relevant safety standards.

This means capacitors are preferably of the self-healing surge type and resistors of the high-impedance, high-voltage surge type. The X capacitor network provides isolation between phases which is equivalent to a passive LC filter. In this invention connection to earth is made only from the star point. There are 5 earth connection points. These are marked 'HV' on the diagram. The components used at these points provide earth isolation. The circuit layout and integration of all isolating components must include proper creeping and clearance consideration. Other isolation schemes are possible.

Immunity to Conducted Transients

The circuit is immune to all forms of conducted transient (Surge, Burst and ESD). By far the most severe of these is Surge. Symmetrical Surge passes through the X capacitors in the normal way. The active circuits have been adapted to withstand asymmetrical Surge events. Surge current will pass from the star point, through the solid state relay 420 and transconductance amplifier 460. Power semiconductors in the solid state relay 420 and transconductance amplifier 460 are each protected from over current by internal current limiting. The transconductance amplifier 460 and solid state relay 420 are each protected form over voltage by a varistor in parallel. These are marked S in FIG. 4.

The high-voltage strategy and transient protection measures described above protect the active circuits from damage during high-potential testing. The filter of this embodiment can be subjected to DC high-potential testing as required in the relevant filter standards.

Figure 7:
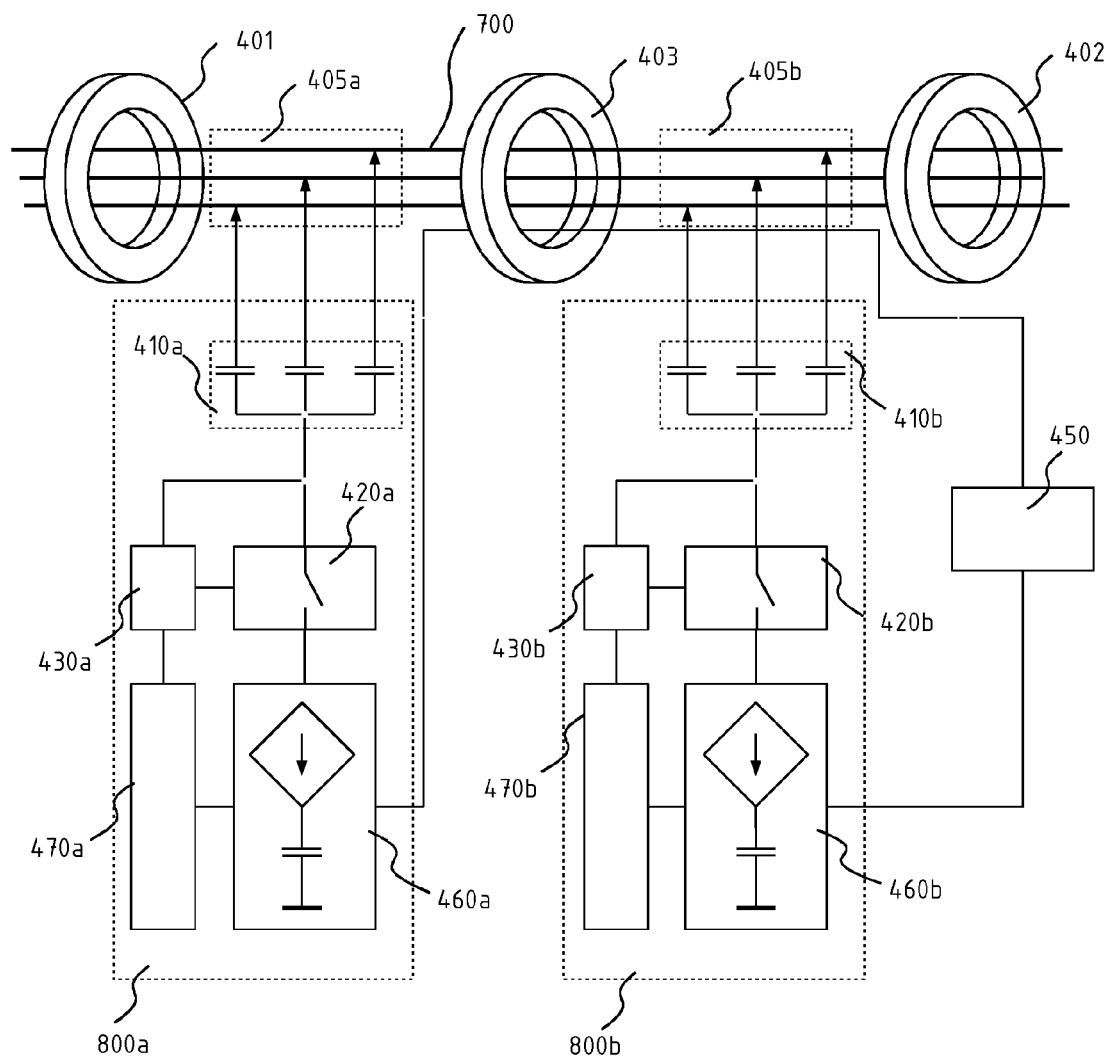
FIGS. 7 and 8 illustrate schematically two second-order filters according to the invention.

FIG. 7 shows an example of realization of a two-stage filter using two identical modules 800a/800b according to one aspect of the invention. Each module is preferably realized on a PCB and comprises a transconductance amplifier 460a/460b, a high-pass filter 470a/470b, a SSR switch 420a/420b, an array of "X" capacitors 410a/410b and a discriminator 430a430/b. The auxiliary power supply unit 450 is common between the modules. Importantly, the supply line for the line side module 800a makes a half-turn in the central core 403, in order to avoid crosstalk. Each module 800a/800b has a IDC device 405a/405b to contact the phase conductors 700.

Figure 8:
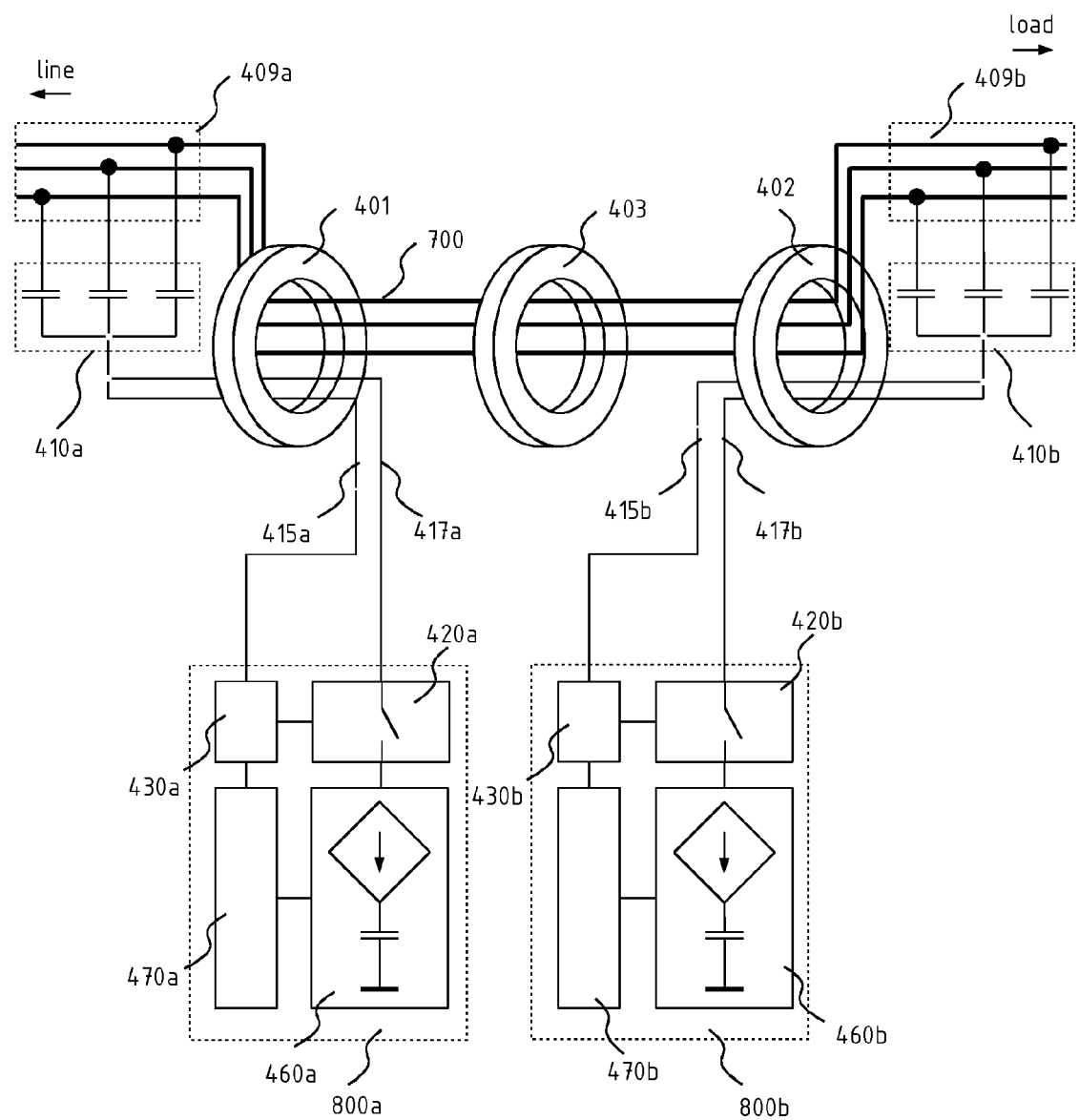

The IDC connectors 405a/405b must be especially designed for each type of line conductor 700, and it would not be practical to do it for every conceivable type of cable, or if the phase conductors are not insulated. FIG. 8 illustrates an alternative embodiment of the present invention providing a two stage filter equivalent to the realization of FIG. 7 without IDC connectors and without a galvanic connection to the phase conductors 700 between the line-side inductance 401 and the load-side inductance 402. In this case, the modules 800a/800b connect to the phase conductors at the line terminals 409a and, respectively, at the load terminals 409b. Since the noise wires 417a and 417b and the sense wires 415a and 415b are passed in the line-side choke 401 and, respectively, in the load-side choke 402, the induced emf on these wires is equal to the total emf in the line conductors 700. The voltage sensed by the sense wires 415a, 415b is therefore the same as if X networks were inserted between the chokes, as in the previous example.

The filter is therefore electrically equivalent to the one of FIG. 7 and has essentially the same frequency response. Passing the sense wires 415a/415b and the noise wires 417a/417b in the inductors 401, 402, one creates virtual shunt nodes (VSN) that are equivalent to connecting between the inductors 401, 402. The increase in cable length is of no consequence because, as already seen, the impedance of the cables is compensated by the amplifier's gain.

One advantage of the filter of the present invention is that it maintains a low earth leakage current at all times, thus being compatible with RCD devices. Another advantage is the simple inductor's structure, where typically the power conductors pass straight through the filter, without windings.

The invention claimed is:

1. An EMC filter, for filtering a noise component on a power line, comprising:
    at least one inductor on the power line, a shunt module, for shunting to earth, at least within a given frequency band, said noise component on the power line, comprising an high-pass filter providing a noise signal, representative of said noise component on the power line, and a controlled source responsive to said noise signal, shunting to earth a current controlled by the noise signal.

2. The EMC filter of claim 1, wherein the power line is a three-phase line, and comprising a capacitor network providing a star point wherein the controlled source is connected between said star point and a ground potential, and an input of the high-pass filter is connected to said star point.

3. The EMC filter of claim 1, further comprising a switch unit, arranged to detect a fault condition and to isolate the controlled source the from the power line in this event.

4. The EMC filter of claim 2, further comprising a switch unit, interposed between the star point and the controlled source, and a voltage discriminator, responsive to an electric potential at the star point, arranged to detect a fault condition when the electric potential of the star point exceeds a set limit, and to insulate said controlled source from the power line in this event.

5. The EMC filter of claim 4, further comprising an error output, to indicate the fault condition detected by the voltage discriminator.

6. The EMC filter of claim 4, wherein said switch unit comprises a solid-state relay.

7. The EMC filter of claim 4, wherein said switch unit is arranged to isolate the controlled source from the power line at power-on, to prevent an inrush current.

8. The EMC filter of claim 1, comprising a separate sense wire to an input of the high-pass filter.

9. The EMC filter of claim 1, including a negative feedback loop which tends to stabilize an input potential at a constant value, at least in band of frequencies.

10. The EMC filter of claim 1, including at least one high-voltage rated capacitor and/or at least one high-voltage rated resistor to positively insulate voltage conductors from earth potential.

11. The EMC filter of claim 1, including at least one use of insulator-displacement connector to the power line.

12. The EMC filter of claim 1, including at least a line terminal and a load terminal, the filter including at least one virtual shunt node, whereas the shunt module is connected, via the virtual shunt node, directly to the line terminal or to the load terminal.

13. An active shunt module for shunting to earth, at least within a given frequency band, said noise components on a power line, comprising an high-pass filter providing a noise signal, representative of a noise component on the power line, and a controlled source responsive to said noise signal, shunting to earth a current controlled by the noise signal.

14. The active shunt module of claim 13, wherein the power line is a three-phase line, and comprising a capacitor network providing a star point wherein the controlled current source is connected between said star point and ground potential, and an input of the high-pass filter is connected to said star point, and a switch unit, arranged to detect a fault condition and to insulate the controlled source the from the power line in this event.

* * * * *